G. B. ELY.
CLOTHESLINE FASTENER.
APPLICATION FILED FEB. 1, 1921.
1,420,370.
Patented June 20, 1922.
2 SHEETS—SHEET 1.
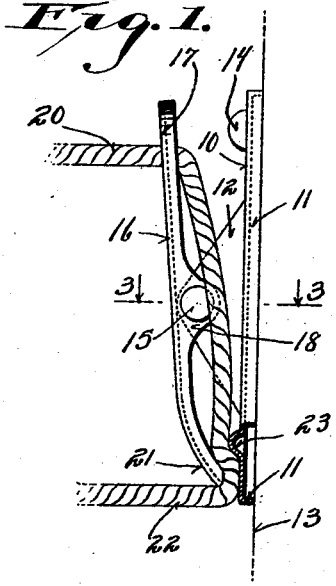
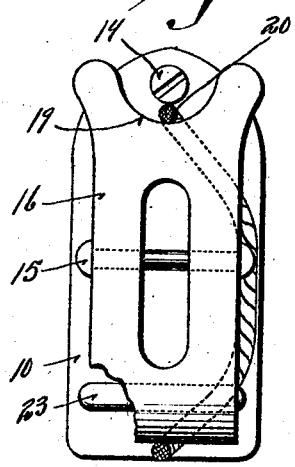
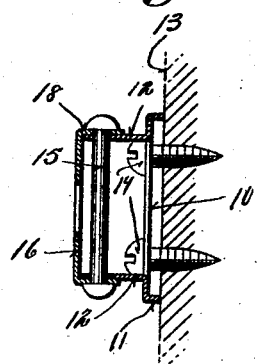
Inventor:
George B. Ely
By Young & Young
Attorneys
Witness:
Robert E. Weber

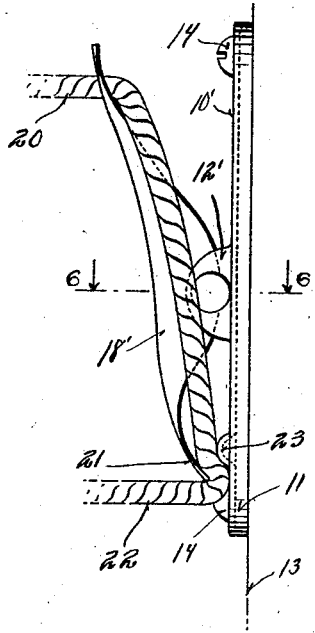
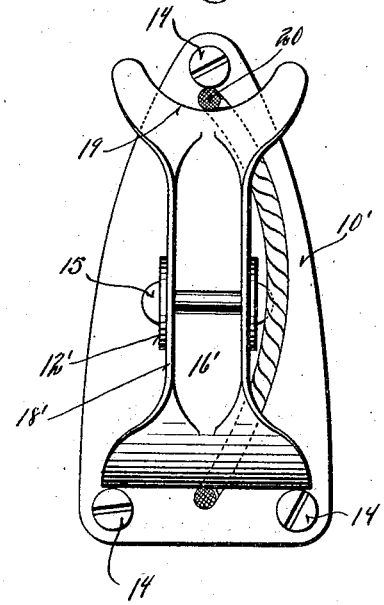
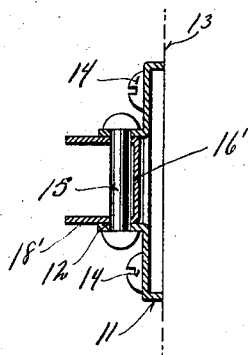

UNITED STATES PATENT OFFICE.

GEORGE B. ELY, OF OLIVET, MICHIGAN, ASSIGNOR OF TWO-THIRDS TO WILLIAM H. ORTMAN, OF MILWAUKEE, WISCONSIN.

CLOTHESLINE FASTENER.

1,420,370.　　　　　Specification of Letters Patent.　　Patented June 20, 1922.

Application filed February 1, 1921. Serial No. 441,532.

*To all whom it may concern:*

Be it known that I, GEORGE B. ELY, a citizen of the United States, and resident of Olivet, in the county of Eaton and State of Michigan, have invented certain new and useful Improvements in Clothesline Fasteners; and I do hereby declare that the following is a full, clear, and exact description thereof.

This invention relates to new and useful improvements in clothes line fasteners, and its principal object is to provide a device which may be readily attached to a fence or post and to which the line may be fastened quickly without tying.

A further object of the invention is to provide a device of the character described which will be more efficient, practical and serviceable than those now known, and which can be manufactured at slight cost.

The idea of the invention may be carried out in various ways, and I do not therefore wish to be limited to the precise structure herein shown, but I wish it understood that I am entitled to all equivalents which come within the scope of the claim.

In describing the device, reference will be had to the accompanying drawings, in which:

Figure 1 is a side elevation with a portion shown in section.

Figure 2 is a front elevation with a portion broken away.

Figure 3 is a section on the line 3—3 of Figure 1,

Figure 4 illustrates in side elevation a modification of the device.

Figure 5 is a front elevation of the form shown in Figure 4, and

Figure 6 is a section on the line 6—6 of Figure 4.

Like reference characters will be used in designating like parts throughout the several views.

The device comprises a supporting member 10, provided with the peripheral flanges 11 and with the upstanding ears 12, said supporting member being attached to the wall or fence 13 by the screws 14.

A pivot member 15 is secured in the ears 12, and on this is pivotally mounted the member 16 formed with the downturned peripheral flange 17, which is enlarged into the ears 18 for the purpose of receiving the pivot pin 15. The member 16 is formed with a recess 19 in its upper end over which is drawn the line 20. The lower end of the member 16 is turned inwardly to coact with rib 23, formed in the supporting member 10, and the end of the line 22 is thus held between members 21 and 23, and the greater the weight that is carried by the line 20 the greater will be the gripping action between members 21 and 23.

The modification shown in Figures 4, 5 and 6 differs from the form previously described in the following particulars: The supporting member 10' is of somewhat different design, and has the upstanding ears 12' which are outside of the pivoted member 18'. This pivoted member is provided with the upstanding flanges 16'.

Having thus described my invention, what I desire to secure by Letters Patent is:

In a clothes line fastener, a sheet metal support having a peripheral flange inwardly directed therefrom, a pair of parallel flat ears cut from the central portion and bent outwardly therefrom, extending at substantially right angles to the face of said support and spaced slightly from the straight side edges of said support, a pivot supported in said ears, said support having an enlarged central opening, a transverse, struck-up rib spaced slightly from said central opening, a sheet metal clamping member, a flange inwardly directed therefrom, substantially at right angles to the plane of the surface of said clamp and extending about the inner periphery thereof, lugs formed on said flange mounted upon said pivot and closely gripping said ears, said clamp being bifurcated at its upper portion to receive a rope, and inwardly bent at its lower portion to exert a gripping action upon a rope, said clamping member and said rib cooperating to retain a clothes line therebetween.

In testimony that I claim the foregoing I have hereunto set my hand at Olivet, in the county of Eaton and State of Michigan.

GEORGE B. ELY.